United States Patent
Yoshii et al.

[19]

[11] Patent Number: 6,126,251
[45] Date of Patent: Oct. 3, 2000

[54] BRAKE CONTROLLING APPARATUS FOR ELECTRIC VEHICLE

[75] Inventors: Kinya Yoshii; Eiji Ichioka; Takeharu Koide, all of Toyota, Japan

[73] Assignee: Toyota Jidosha Kabushiki Kaisha, Toyota, Japan

[21] Appl. No.: 09/071,803

[22] Filed: May 4, 1998

[30] Foreign Application Priority Data

Apr. 3, 1997 [JP] Japan ................................. 9-178689

[51] Int. Cl.[7] ...................................................... B60T 8/64
[52] U.S. Cl. ........................................................ 303/152
[58] Field of Search .................................. 303/3, 2, 151, 303/152; 188/156, 158, 19; 180/165, 65.1, 65.2, 65.3, 65.4

[56] References Cited

U.S. PATENT DOCUMENTS

| | | | |
|---|---|---|---|
| 5,492,192 | 2/1996 | Brooks et al. | 180/165 |
| 5,542,754 | 8/1996 | Aoki et al. | 303/3 |
| 5,775,784 | 7/1998 | Koga et al. | 303/152 |
| 5,915,801 | 6/1999 | Taga et al. | 303/152 |

FOREIGN PATENT DOCUMENTS

| | | |
|---|---|---|
| 5-3604 | 1/1993 | Japan . |
| 5-161210 | 6/1993 | Japan . |
| WO96/16831 | 6/1996 | Japan .................................... 303/152 |

Primary Examiner—Robert J. Oberleitner
Assistant Examiner—Melanie Talavera
Attorney, Agent, or Firm—Oliff & Berridge, PLC

[57] ABSTRACT

A brake controlling apparatus for electric vehicles provided with a transmission between an electric motor and wheels. Regenerative brake control furnishes a regenerative braking force to the vehicle. A transmission control switches a stage of gear of the transmission the basis of driver operation. A friction brake control furnishes a friction braking force to the vehicle by controlling a friction brake. During gear shifting control, the regenerative brake control sets a regenerative torque essentially to zero, and the friction brake control supplements the regenerative braking force that was furnished to the vehicle prior to gear shifting control with the friction braking force. Therefore, there is no drop in deceleration during gear shifting control, even if the driver downshifts during regenerative braking. Smooth gear shifting is then possible.

3 Claims, 8 Drawing Sheets

| TRAVEL RANGE | REQUIRED REGENERATIVE TORQUE | | WHEEL SHAFT DECELERATION TORQUE |
| --- | --- | --- | --- |
| | 1st | 2nd | |
| D | $\dfrac{(T_D + kF)}{i_1}$ | $\dfrac{(T_D + kF)}{i_2}$ | $T_D + kF$ |
| L | $\dfrac{(T_L + kF)}{i_1}$ | $\dfrac{(T_L + kF)}{i_2}$ | $T_L + kF$ |

$T_D < T_L \qquad i_1 > i_2$

BRAKE CONTROLLING APPARATUS FOR ELECTRIC VEHICLE

BACKGROUND OF THE INVENTION

1. Field of the Invention

The present invention relates to a brake controlling apparatus for an electric vehicle, and more particularly to an apparatus for reducing vehicle speed utilizing regenerative braking of an electric motor and a friction braking force of a friction brake.

2. Description of the Related Art

To meet the need for low emission and low noise vehicles, various types of electric vehicles have been proposed, some of which have reached practical application. In the deceleration of electric vehicles, when acceleration is off or braking is on, the use of regenerative braking of an electric motor is widely known. Through regenerative braking, a regenerative torque is generated by the electric motor in a direction opposite to the driving operation and a braking force similar to that from engine braking in a vehicle equipped with an internal combustion engine is obtained. A driver can adjust the vehicle speed, such as when traveling down a slope, by releasing the accelerator, much in the same manner as using an engine brake. During regenerative braking, the electric motor operates as a generator. The generated electric power then charges a battery so as to improve energy efficiency.

Japanese Patent Laid-Open Publication No. Hei 5-161210 describes an electric vehicle using a combination of a regenerative braking force from an electric motor and a friction braking force from a friction brake. Here, friction brake refers to a mechanical brake that causes a vehicle to decelerate by a mechanically based frictional force. Wheel brakes are common friction brakes. In the apparatus of the above-mentioned publication, when the required braking force based on an amount of brake operation is small, the required braking force is attained using only the regenerative braking force. When the required braking force exceeds a maximum value of the regenerative braking force, the required braking force is attained using a combination of the regenerative braking force and the friction braking force.

The most popular type of conventional electric vehicle has had no transmission and has therefore had a fixed gear ratio between the motor and wheels because electric motors can generate sufficient driving torque across a wide rotational speed range and are quiet even at high rotational speeds. In contrast, vehicles equipped with an internal combustion engine have been heretofore provided with a transmission to ensure a sufficient torque at low vehicle speeds. However, in electric vehicles without a transmission, the electric motor is frequently used at high rotational speeds, thereby increasing the load on auxiliary machinery related to the electric motor. Consequently, for efficient use of the electric motor, the disposition of a transmission between the electric motor and wheels has been proposed. The electric vehicle described in the above-mentioned Japanese Patent Laid-Open Publication No. Hei 5-161210 is also equipped with a transmission.

In an electric vehicle equipped with a transmission, it is also preferable to improve energy efficiency by effectively using regenerative braking. For example, when a driver depresses a brake pedal, a regenerative braking force (or a combination regenerative braking force and friction braking force) are generated. When the driver changes a shift range from this state by operating a shift lever, downshifting is performed corresponding to the range change. A gear ratio changes due to the downshifting so that a larger regenerative braking force is furnished to the vehicle.

However, when an attempt is made to perform this sort of braking control, the following problem arises. Generally, it is necessary to set the torque of the electric motor to approximately zero during gear shifting control in which the transmission switches a stage of gear. Therefore, in a case where the driver performs a lever operation to downshift during braking, the regenerative torque temporarily becomes zero while downshifting so that deceleration of the vehicle decreases. As the downshifting completes, a deceleration larger than that prior to the downshifting suddenly occurs. This sort of fluctuation in deceleration causes the driver to experience a poor ride. Under these circumstances, effective regenerative braking extending over a plurality of gear stages, namely, regenerative braking before and after gear shifting has not heretofore been known.

SUMMARY OF THE INVENTION

It is therefore an object of the present invention to provide a brake controlling apparatus for the electric vehicle capable of eliminating the generation of a rough ride caused by inappropriate fluctuations in deceleration, even when gear shifting corresponding to driver operation is performed during regenerative braking.

In order to achieve this object, the brake controlling apparatus for the electric vehicle of the present invention, applicable to electric vehicles in which a torque of an electric motor is transmitted to wheels via a transmission, comprises regenerative brake controlling means for furnishing a regenerative braking force to a vehicle by causing the electric motor to generate regenerative torque, transmission controlling means for performing gear shifting control to switch a stage of gear of the transmission on the basis of gear shifting operation by a driver and changing the regenerative braking force according to the stage of gear, and friction brake controlling means for controlling a friction braking force from a friction brake and furnishing to the vehicle the friction braking force equivalent to the difference between a required braking force required by the vehicle and the regenerative braking force, where the regenerative brake controlling means sets the regenerative torque essentially to zero during gear shifting control corresponding to the occurrence of the gear shifting operation, and the friction brake controlling means supplements with friction braking force the regenerative braking force that was furnished to the vehicle prior to gear shifting control.

The above-mentioned gear shifting operation may, for example, be an operation to change the shift range by operating a shift lever. Accompanying the change in shift range immediately thereafter or sometime thereafter is the switching of the stage of gear.

According to the present invention, the regenerative torque is set to zero at the start of gear shifting control corresponding to the occurrence of the gear shifting operation, while a friction braking force equivalent to the regenerative braking force prior to gear shifting control is furnished to the vehicle. Therefore, deceleration of the vehicle does not change suddenly, even when gear shifting control begins. The driver need not experience a poor ride due to a sudden drop in deceleration when performing the gear shifting operation. Since a rough ride is not caused, the use of regenerative braking over a plurality of stages of gears can be actively implemented. Namely, regenerative braking can be actively used before and after gear shifting.

Another object of the present invention is to provide, in addition to preventing the poor ride as mentioned above, a brake controlling apparatus for the electric vehicle that lightens the load on the friction braking apparatus, thus improving reliability.

In order to achieve this object, in another aspect of the brake controlling apparatus of the present invention, after completion of the above-mentioned gear shifting control, the friction brake controlling means maintains the friction braking force during gear shifting control, and the regenerative brake controlling means furnishes to the vehicle a regenerative braking force equivalent to the difference between the abovementioned required braking force and the friction braking force.

According to this aspect, the friction brake controlling means need not change the friction braking force at the completion of gear shifting control. Therefore, the operations of the configuration of the friction brake system are reduced in number. As an example, a hydraulic friction brake is considered. Normally, a solenoid valve is used to control the friction braking force. The application of the present invention enables the number of operations to switch the solenoid valve to be reduced. Therefore, the durability and reliability of the configuration of the friction brake system can be improved.

Still another object of the present invention is to provide a brake controlling apparatus capable of achieving preferable braking control also during travel at high vehicle speeds. There are instances where downshifting is not possible immediately after performing a gear shifting operation at high vehicle speeds because the motor rotational speed would be too high after downshifting. In such an instance, until the vehicle speed drops, deceleration cannot be increased by downshifting, and as a result, the responsiveness to the gear shifting operation lowers. In order to solve this problem, it is a further object of the present invention to provide a brake controlling apparatus capable of realizing high responsiveness of deceleration and preventing the above-mentioned poor ride when the driver performs gear shifting operation during high speed travel.

In order to achieve this object, in another aspect of the present invention when gear shifting operation is performed, the transmission controlling means compares, when gear shifting operation is performed, a present speed with a predetermined gear shifting standard vehicle speed, and suspends execution of gear shifting control while the present speed exceeds the gear shifting standard vehicle speed, where a required braking force corresponding to the gear stage after gear shifting is generated by at least either the regenerative brake controlling means or the friction brake controlling means while execution of gear shifting control is suspended.

During high vehicle speed travel, gear shifting control is suspended even if gear shifting operation is performed. During suspension of gear shifting control, the braking force cannot be increased by switching gears. However, according to the present invention, the required braking force corresponding to the stage of gear after gear shifting is achieved by an increase in the regenerative torque or friction braking force during suspension of gear shifting control. Therefore, deceleration responsiveness is ensured for the gear shifting operation. Furthermore, as described above, once gear shifting control begins, the regenerative torque is set to approximately zero and the regenerative braking force is supplemented with the friction braking force. Therefore, braking control during gear shifting is performed smoothly. In this manner, according to the present invention, both high deceleration responsiveness for the gear shifting operation and smooth braking control during gear shifting are achieved. In general, therefore, a braking control suitably meeting the needs of the driver is performed.

DETAILED DESCRIPTION OF THE PREFERRED EMBODIMENTS

Embodiment 1

Figure 1:
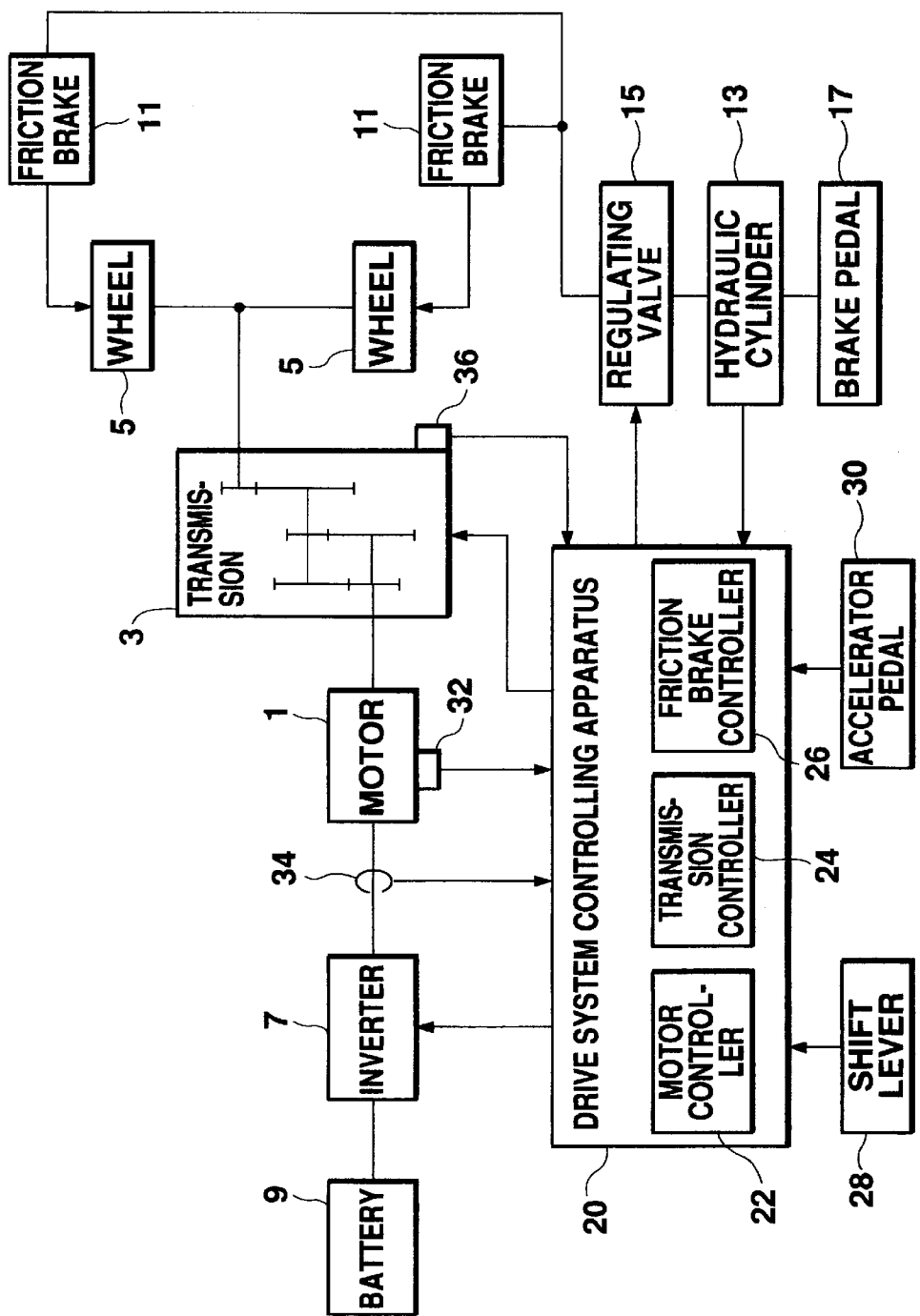
FIG. 1 is a block diagram showing an overall configuration of a first embodiment of the present invention.

Preferred embodiments of the present invention will be described in the following with reference to the accompanying drawings. FIG. 1 shows a drive system of an electric vehicle equipped with a brake controlling apparatus of the present invention. The brake controlling apparatus of the present invention is integrated with the drive system controlling apparatus.

In FIG. 1, a transmission 3 is linked to an electric motor 1, which generates a vehicle driving force. The transmission 3 comprises a widely known two-axle gear mechanism with two forward speeds. The transmission 3 is linked to wheels 5 via a differential gear apparatus (not shown). A power-drive torque generated by the electric motor 1 is transmitted to the wheels 5 via the transmission 3.

The electric motor 1 is connected to a battery 9 via an inverter 7. The inverter 7 is equipped with a plurality of switching devices and regulates the supply of current to the electric motor 1. The electric motor 1 is driven by the current supplied from the inverter 7.

A friction brake apparatus 11 uses frictional force to brake the rotation of the wheels 5. In this embodiment, the friction brake apparatus 11 is a disc type, and includes a disc that rotates with the wheel and a brake pad that is in frictional contact with the disc. Oil pressure is transmitted to the friction brake apparatus 11 via a regulating valve 15 with solenoid valve from a hydraulic cylinder 13. When a driver presses on a brake pedal 17, the oil pressure is created at the hydraulic cylinder 13, the brake pad is pressed against the disc, and the frictional force created brakes the rotation of the wheels 5.

A drive system controlling apparatus 20 controls the entire system and comprises a motor controller 22, a transmission controller 24, and a friction brake controller 26. The controllers may be integrated into a single unit or may be separate electronic controlling apparatuses. The drive system controlling apparatus 20 inputs a travel range selected by the driver from a shift lever 28. The driver can set the travel range to, for example, P (park), R (reverse), N (neutral), D (forward drive), or L (forward low) by moving the shift lever. Furthermore, the drive system controlling apparatus 20 inputs information from an accelerator pedal 30 indicating an amount θ of accelerator operation by the driver. The amount θ of accelerator operation, 0% when the accelerator is off and 100% when the accelerator is completely on (pedal fully depressed), changes in proportion to the amount of accelerator pedal depression. The drive system controlling apparatus 20 also inputs an electric signal from the hydraulic cylinder 13 indicating the oil pressure within the cylinder. On the basis of this electric signal, the magnitude of the depressing force on the brake pedal 17 is detected as the amount of brake operation by the driver. The movement (stroke) of the brake pedal may be detected, instead of the oil pressure, in order to determine the amount of brake operation.

The drive system controlling apparatus 20 also inputs a motor rotational speed N from a rotational sensor 32 provided on the electric motor 1 and a current value I from a current sensor 34 of current supplied to the electric motor 1. Furthermore, the drive system controlling apparatus 20 inputs information indicating a vehicle speed V from a vehicle speed sensor 36 provided at the output of the transmission 3. The vehicle speed sensor 36 detects the rotational speed of the output shaft of the transmission 3.

The motor controller 22 controls the electric motor 1 by supplying a switching signal to the inverter 7. The motor controller 22 is provided with a widely known vector controller and PWM (pulse width modulation) controller, generates the switching signal based on the input information, and supplies it to the inverter 7.

When the accelerator is on, the motor controller 22 controls the electric motor 1 to generate a power-drive torque proportional to the amount of accelerator operation. The motor controller 22 stores a torque map showing a correspondence of the motor rotational speed N and the amount θ% of accelerator operation with the power-drive torque that the electric motor is to generate. The motor controller 22 determines a torque command value according to the aforementioned torque map on the basis of information on the input rotational speed N and amount θ% of accelerator operation. At the motor controller 22, a current command is obtained in response to the determined torque command on the basis of the motor rotational speed N and motor current I, and furthermore a switching signal is generated in response to the current command. This switching signal is output to the inverter 7 and a switching device of the inverter 7 operates according to the switching signal. As a result, a DC current that is supplied from the battery 9 to the inverter 7 is converted by the inverter 7 to an AC current and supplied to the electric motor 1. At this point, the switching signal is set on the basis of the torque command value. Therefore, the electric motor 1 is driven by the current supplied from the inverter 7 and generates a torque that is equivalent to the command value determined by the motor controller 22.

When the accelerator turns off, the torque command value becomes regenerative (negative). The motor controller 22 performs regenerative braking control by outputting a switching signal to the inverter 7. At this point, the electric motor 1 rotates due to the rotational force of the wheels 5 and operates as a generator. A generated current is converted to a DC current by the inverter 7, which operates according to the switching signal, and charges the battery 9. A regenerative torque, having a direction opposite to that of the power-drive torque, becomes a resistance so that the vehicle decelerates.

Figures 2, 3:
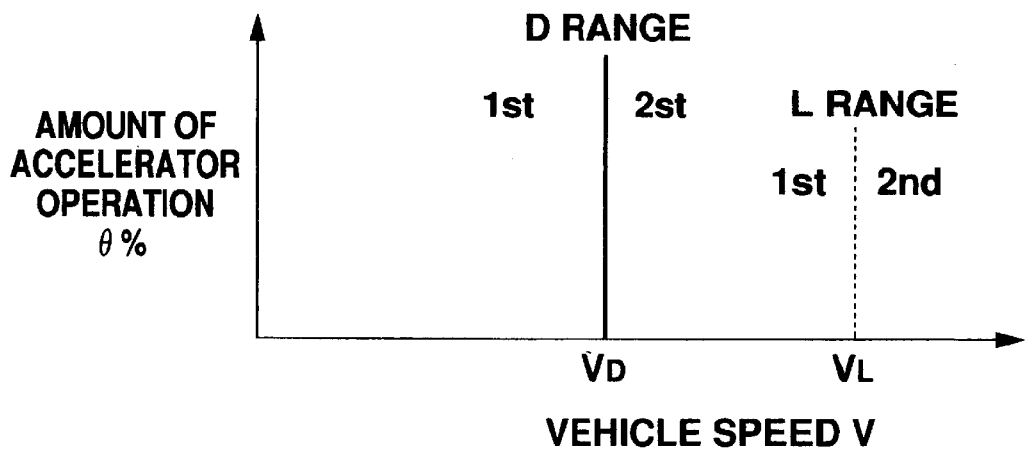
FIG. 2 shows the required regenerative torque that is set at a motor controller in the system of FIG. 1.
FIG. 3 shows a gear shifting map that was set at a transmission controller in the system of FIG. 1.

The motor controller 22 determines the required regenerative torque according to FIG. 2 and controls the electric motor 1 to generate the required regenerative torque. In FIG. 2. TD and TL are standard required deceleration torque values. TD is a wheel shaft deceleration torque to be generated for the D range when the accelerator is off and the brake is off. TL is a similar wheel shaft deceleration torque for the L range, where TL>TD. F is a brake depressing force determined from the output of the hydraulic cylinder 13 and k is proportional constant. Furthermore, i1 is a gear ratio (between electric motor and wheel) of the first speed and i2 is a gear ratio of the second speed.

In order to obtain the required braking force, the wheel shaft deceleration torque having a one-to-one correspondence with the required braking force is controlled. First, the required value of the wheel shaft deceleration torque is determined. The required value is the sum of the standard required deceleration torque (TD or TL) and a deceleration torque kF, which is proportional to the brake depressing force. The required value differs depending on the travel range. Then, using a formula in FIG. 2, the required regenerative torque that the electric motor 1 is to generate is calculated to obtain the above-mentioned wheel shaft deceleration torque. The electric motor 1 is then controlled so that the required regenerative torque set in this manner is generated. As shown in FIG. 2, when one travel range has been set in this embodiment, an identical deceleration is obtained whether traveling in first speed or second speed. This deceleration changes in proportion to the brake depressing force.

Next, the transmission controller 24 will be described. The transmission controller 24 controls the gear shifting of the transmission 3 on the basis of a gear shifting map of FIG. 3. As shown in FIG. 3, when the D range is set, gear shifting is performed using a vehicle speed VD as a standard. When the vehicle speed rises and reaches VD, upshifting to the second speed is performed, and when the vehicle speed lowers and reaches VD, downshifting to the first speed is performed. Preferably, VD is set differently for upshifting and for downshifting.

When the L range is set, as a rule, only the first speed is set, and gear shifting is not performed. In the L range, the electric motor 1 is controlled so that the maximum vehicle speed does not exceed VL. However, during travel at a high speed exceeding vehicle speed VL in the second speed of the D range, it is assumed that the shift lever was operated. Since the vehicle speed is excessively high in this case, downshifting cannot be performed immediately, thus the second speed is maintained. After waiting for the vehicle speed to drop to VL (broken line in FIG. 3), downshifting is performed.

As FIG. 3 clearly shows, the transmission controlling apparatus does not, as a rule, perform gear shifting according to the amount θ of accelerator operation because there is no difference in efficiency at the motor due to rotational speed and becuase the motor is quiet, even at high rotational speeds. Upshifting when the accelerator is off as in internal combustion engine powered vehicles is unnecessary in electric vehicles. Rather, the so-called "kick down" during acceleration is unnecessary and the mid-range acceleration can be improved.

Next, the friction brake controller 26 will be described. The friction brake controller 26 controls the braking torque generated by the friction brake apparatus 11. The friction brake controller 26 outputs a control signal to the regulating valve 15 with solenoid valve. The regulating valve 15 regulates the amount of oil pressure sent to the friction brake apparatus 11 according to the control signal. As a result, a required amount of oil pressure indicated by the control signal, and not the total oil pressure generated by the hydraulic cylinder 13, is sent to the friction brake apparatus 11. The friction brake apparatus 11 generates a braking force of a magnitude corresponding to the oil pressure that is input. Thus, by outputting a suitable control signal in this manner, the friction brake controller 26 can control the braking torque that is generated by the friction brake apparatus 11.

The friction brake controller 26 operates according to commands from the motor controller 22. The motor controller 22 is set with values for maximum regenerative torque that can be generated for various motor rotational speeds N. The motor controller 22 does not request the friction brake controller 26 to generate a frictional braking force when the required regenerative torque within the aforementioned maximum value.

However, when the driver firmly depresses the brake pedal, the required regenerative torque exceeds the aforementioned maximum value. It is necessary for the friction brake apparatus 11 to generate the braking for the amount exceeded. Accordingly, information indicating the difference between the required regenerative torque and the maximum regenerative torque is sent to the friction brake controller 26. The friction brake apparatus 11, under control of the friction brake controller 26, generates a friction braking force corresponding to the above described difference in torque.

Next, an example operation of the brake controlling apparatus of the present embodiment will be described with reference to the flowchart of FIG. 4. The motor controller 22 judges whether or not the accelerator is off (S10). If the accelerator is on, the operation returns. The motor controller 22 causes the electric motor 1 to generate a power-drive torque corresponding to the amount of accelerator operation. When the accelerator is off, it is judged whether or not the travel range is L (S12) on the basis of the output of the shift lever 28. If the travel range is L, it is then judged whether or not the present stage of gear of the transmission 3 is the first speed (S14). This judgment is based on information from the transmission controller 24. If the stage of gear is the first speed, the required regenerative torque T* to be generated by the electric motor 1 is set to (TL+kF)/i1 as shown in FIG. 2 (S16). If not, namely, if the stage of gear is the second speed, the required regenerative torque of T*=(TL+kF)/i2 is set (S18). As mentioned earlier. TL is the predetermined standard required deceleration torque (for the L range), and i1 and i2 are the respective gear ratios between electric motor and wheels for the first speed and second speed. Furthermore, F is the brake depressing force obtained from the output of the hydraulic cylinder 13 and k is the proportional constant.

On the other hand, when the L range is not set in step S12, step S20 judges whether or not the D range is set. If the D range is not set, namely, if another range is selected, such as P (park), the operation returns. When the D range is selected, it is judged whether or not the present stage of gear is the first speed (S22). If the present stage of gear is the first speed, a regenerative torque of T*=(TD+kF)/i1 is set (S24), and if it is the second speed, a regenerative torque of T*=(TD+kF)/i2 is set (S26). TD is the standard required deceleration torque for the D range.

The required regenerative torque that was determined in the above-mentioned step of S16, S18, S24, or S26 is compared with the maximum regenerative torque Tmax (S28). As mentioned earlier, the maximum regenerative torque Tmax is the maximum regenerative torque that can be generated by the electric motor 1 at the present rotational speed N. If T*≦Tmax, the motor controller 22 controls the electric motor 1 to generate the regenerative torque T* (S30).

On the other hand, when T*>Tmax in step S28, a difference of both torque values or ΔT=T*−Tmax is calculated and sent from the motor controller 22 to the friction brake controller 26. The friction brake controller 26 controls the friction braking force so that a friction braking force necessary to obtain a deceleration corresponding to ΔT is generated (S32). The motor controller 22 replaces regenerative torque T* with Tmax (S34), causes the electric motor 1 to generate T* (or Tmax) (S30), and returns.

Figure 5:
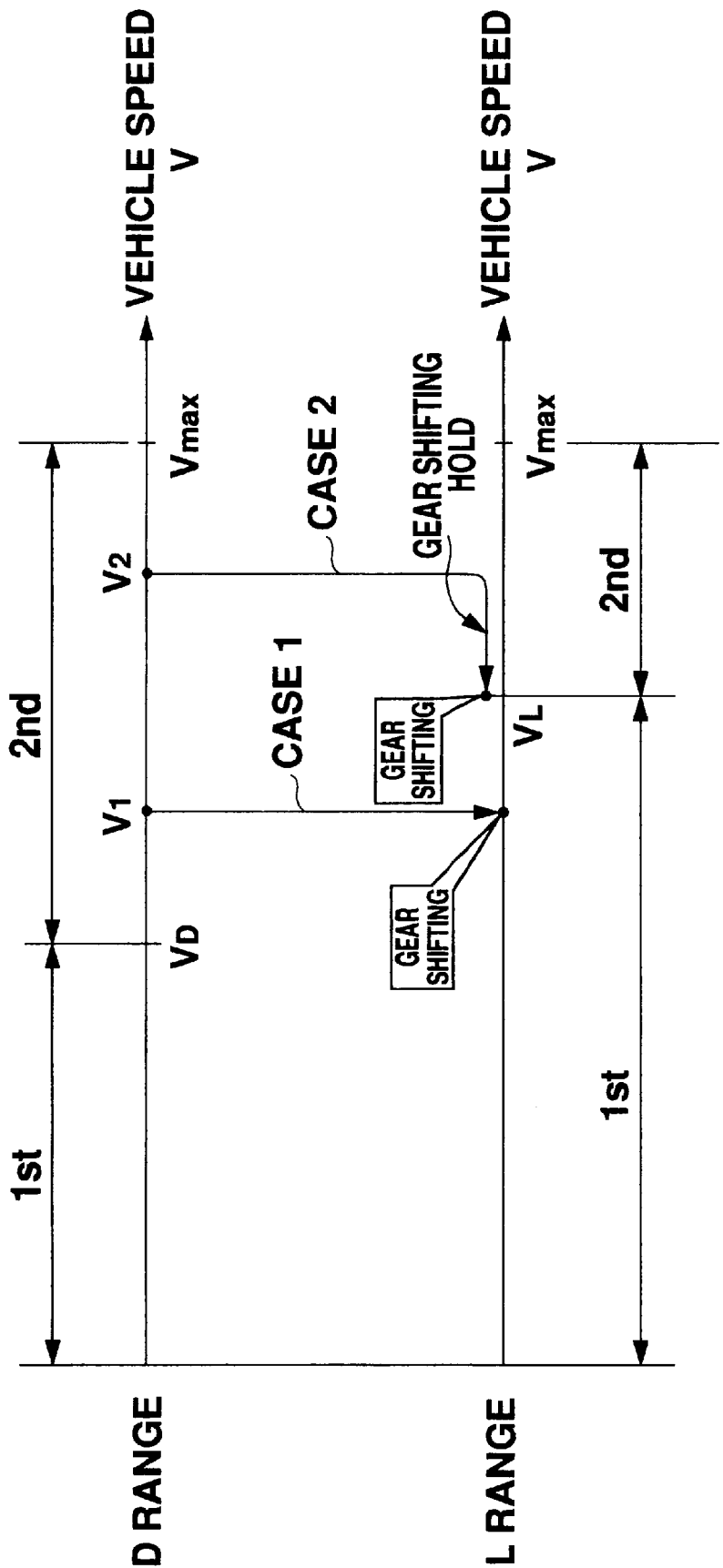
FIG. 5 shows two cases of operation when a shift lever is operated in the system of FIG. 1.

Next, a characteristic gear shifting operation of the present embodiment will be described for when the shift lever is operated during braking. The operation will be described for the two cases shown in FIG. 5. In the first case, the shift lever is moved from the D position to the L position when the vehicle speed is V1 (greater than or equal to VD and less than or equal to VL). In this case, gear shifting control begins as soon as the shift range is changed. In the second case, the shift lever is operated when the vehicle speed is V2 (greater than VL). In this case, gear shifting control does not begin immediately after the shift range is changed. Gear shifting control is performed after waiting until the vehicle speed decreases to VL.

Case 1 (Gear Shifting Immediately After Shift Lever Operation)

Figure 6:
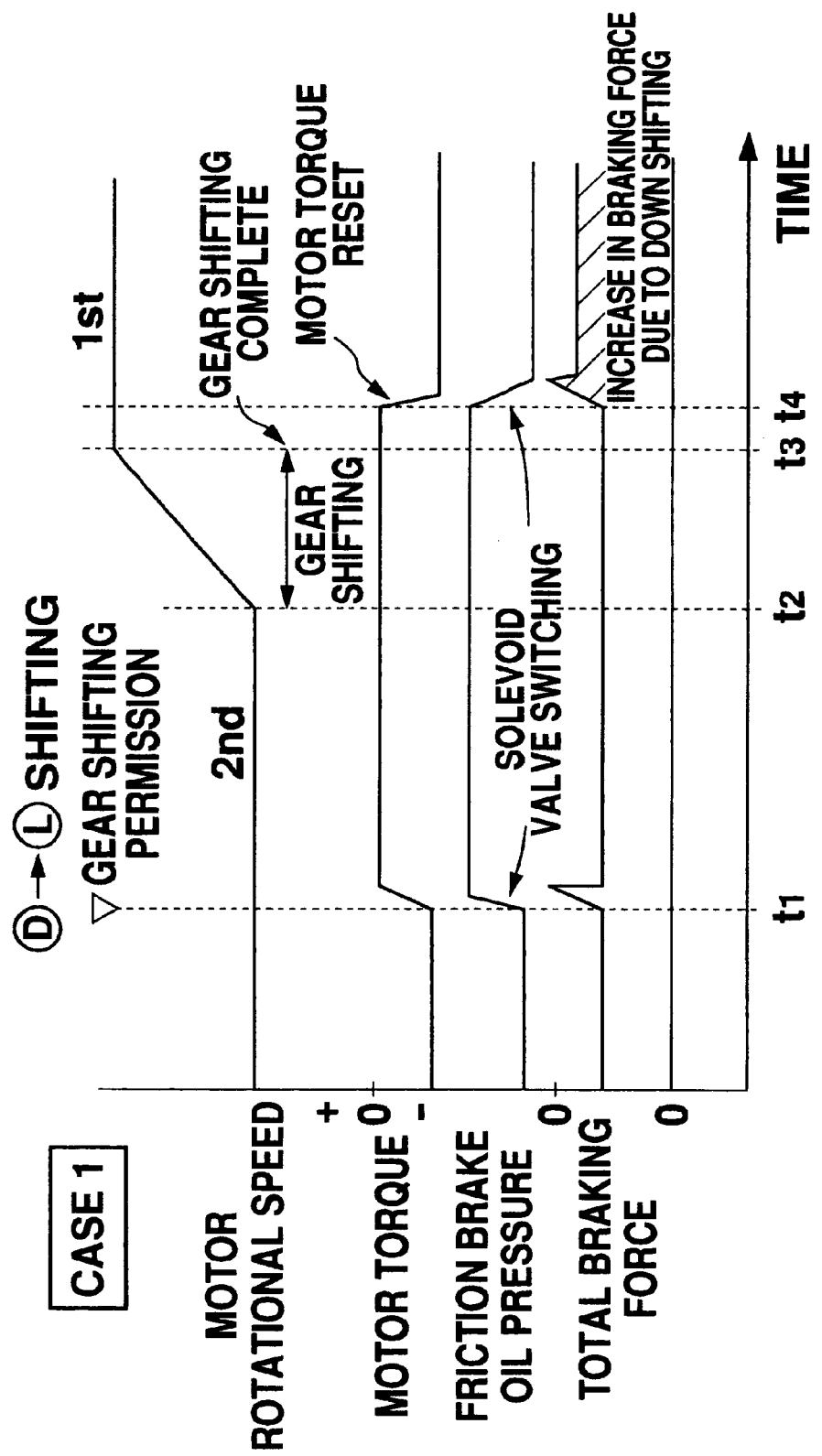
FIG. 6 is a timing chart for braking control in case 1 of FIG. 5.

FIG. 6 is a timing chart for the operation in case 1. Prior to time t1, the shift lever is at the D position and the vehicle speed is V1 (greater than or equal to VD and less than or equal to VL). The second speed is set at the transmission. The electric motor rotates at a rotational speed determined by the gear ratio of the second speed. The driver depresses the brake pedal. A negative torque (regenerative torque) is generated at the electric motor. Oil pressure is also supplied to the friction brake apparatus 11 to actuate the friction brake.

In this state, the driver moves the shift lever from the D position to the L position at time t1. As shown in FIG. 6, gear shifting permission is granted at the transmission controller 24 as soon as the shift lever is moved. The gear shifting permission is sent to the motor controller 22 and the friction brake controller 26. In this embodiment, the period from the granting of the gear shifting permission to the subsequent notification of gear shifting completion is called a "gear shifting control period". Once the gear shifting permission is issued, the motor controller 22 sets the motor torque approximately to zero. The friction brake controller 26 switches the solenoid valve of the regulating valve 15 so as to raise the friction brake oil pressure. The range of the rise in oil pressure (friction brake oil pressure) is set so that the friction brake supplements the wheel shaft deceleration torque that was generated by the regenerative torque. As a result, the sum of the regenerative braking force and friction braking force prior to time t1 becomes equal to the friction braking force from time t1. Therefore, the wheel shaft deceleration torque, or the total braking force, is constant at around time t1.

However, if the regenerative torque drops faster than the friction braking force rises, the total braking force is susceptible to an undesirable momentary drop. In order to avoid this, the regenerative torque and the brake oil pressure are controlled so that the total braking force at time t1 momentarily increases as shown in the figure. Setting the rate of change in the regenerative braking force here to be smaller than the rate of change in the friction braking force achieves a suitable control. The timing for setting the regenerative torque to zero may also be delayed slightly.

After the gear shifting permission at time t1, the gear operation of the transmission 3 begins at time t2 under control of the transmission controller 24. When the gear shifting operation completes at time t3, the electric motor rotates at a rotational speed determined by the gear ratio of the first speed. At time t4, the completion of the gear shifting control is sent from the transmission controller 24 to the motor controller 22 and friction brake controller 26. The motor controller 22 again causes the electric motor to generate a regenerative torque. The friction brake controller 26 switches the solenoid valve of the regulating valve 15 to drop the friction brake oil pressure.

Figure 4:
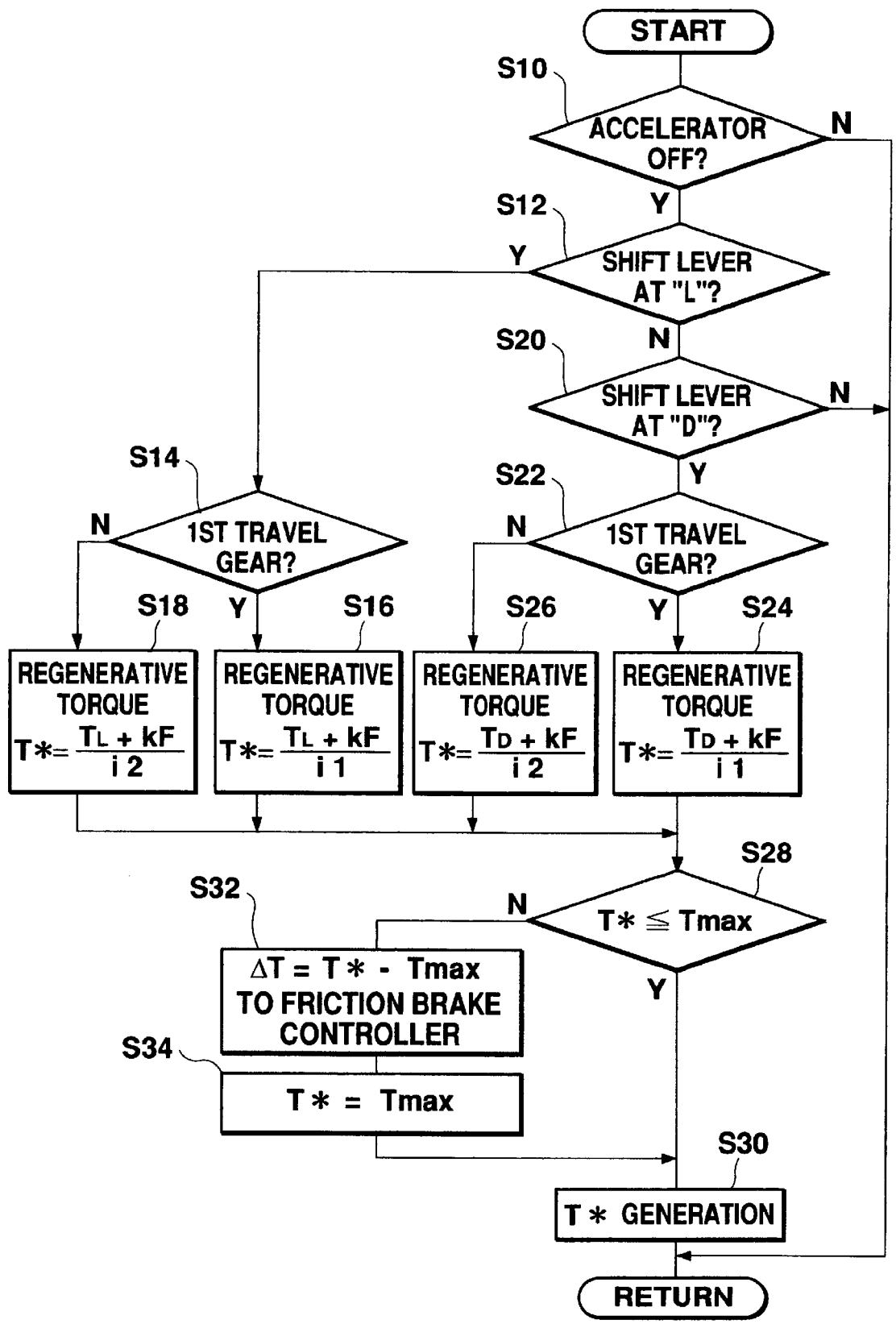
FIG. 4 is a flowchart showing braking control according to the system of FIG. 1.

The values of the regenerative torque and friction brake oil pressure at this time are determined according to FIGS. 2 and 4. At time t4, an increase in the total braking force is generated. The amount of increase corresponds to the difference TD–TL in the wheel shaft deceleration torque of FIG. 2 (provided the brake depressing force from time t1 to t4 is assumed to be constant). Similar to the control at time t1, the regenerative torque and the brake oil pressure are controlled so that the total braking force at time t4 momentarily increases.

According to the above-mentioned control, when the driver operates the shift lever, there is no drop in the total braking force even though the regenerative torque is approximately zero during gear shifting control. Therefore, the increase in braking force due to gear shifting is performed smoothly. Deceleration can thus be increased without the driver experiencing a poor ride. It is furthermore possible to recover more regenerative energy from downshifting.

Case 2 (Gear Shifting After Waiting for the Vehicle Speed to Drop After Shift Lever Operation)

Figure 7:
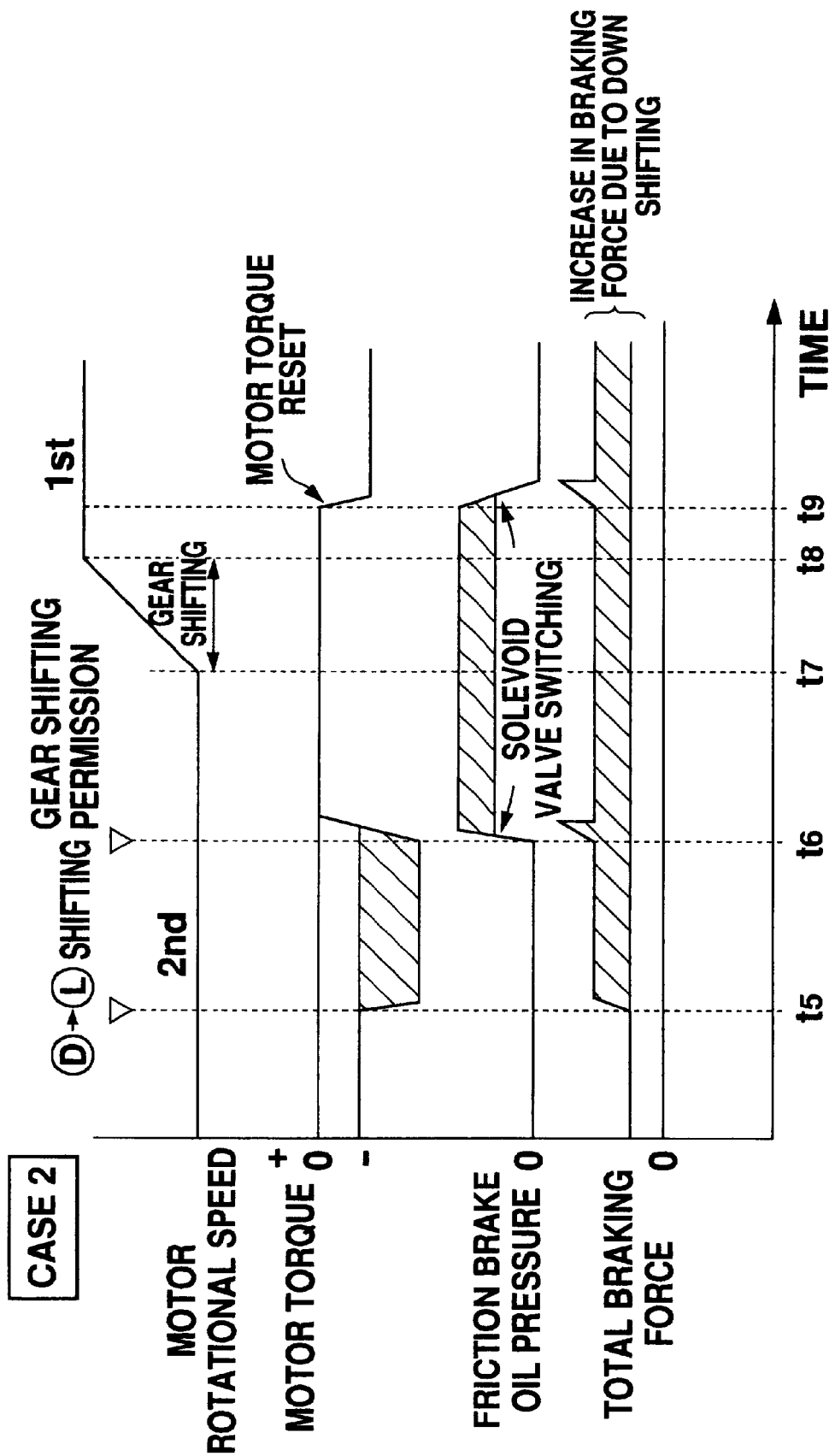
FIG. 7 is a timing chart for braking control in case 2 of FIG. 5.

FIG. 7 is a timing chart for the operation in case 2. Prior to time t5, the shift lever is at the D position and the vehicle speed is V2, which is greater than VL. The second speed is set at the transmission. The electric motor rotates at a rotational speed determined by the gear ratio of the second speed. The driver depresses the brake pedal. A negative torque (regenerative torque) is generated at the electric motor. However, since the brake pedal depressing force is relatively small, a friction brake oil pressure is not generated.

In this state, the driver moves the shift lever from the D position to the L position at time t5. As shown in FIG. 7, gear shifting permission is not granted immediately at the transmission controller 24 since the vehicle speed is greater than VL. The motor controller 22 performs a process for S26 in FIG. 4 prior to time t5, but performs a process for S18 in FIG. 4 from time t5. Therefore, the regenerative torque increases and the total braking force increases. The amount of increase corresponds to the difference TL–TD in the wheel shaft deceleration torque at positions L and D.

The vehicle speed drops due to the braking effect and reaches VL at time t6. Gear shifting permission is granted at the transmission controller 24. This gear shifting permission is sent to the motor controller 22 and the friction brake controller 26. When the gear shifting permission is granted, the motor controller 22 sets the motor torque to approximately zero. The friction brake controller 26 generates a friction brake oil pressure by switching the solenoid valve of the regulating valve 15. Here too, as in case 1, the friction brake oil pressure is set so that the friction brake supplements the wheel shaft deceleration torque that was generated by the regenerative torque. Therefore, the total braking force is constant at around time t6. However, as in case 1, the total braking force momentarily increases at the shift in the regenerative braking force and friction braking force.

At time t7, the gear shifting of the transmission 3 begins under control of the transmission controller 24. This gear shifting operation completes at time t5. The electric motor rotates at a rotational speed determined by the gear ratio of the first speed. At time t9, the completion of the gear shifting control is sent from the transmission controller 24 to the motor controller 22 and friction brake controller 26. The motor controller 22 again causes the electric motor to generate a regenerative torque. The friction brake controller 26 drops the friction brake oil pressure by switching the solenoid valve of the regulating valve 15.

The values of the regenerative torque and friction brake oil pressure at this time are determined as shown in FIGS. 2 and 4. Here, gear shifting was performed from the second speed in the L range to the first speed in the L range. Therefore, as shown in FIG. 2, the wheel shaft deceleration torque, or the total braking force, does not change at around time t9. At time t9, the regenerative braking force increases and the friction braking force decreases. The total braking force, however, momentarily rises. In the manner above, as in case 1, there is no drop in the braking force during gear shifting also in case 2, and the braking force increases smoothly.

In this case, in particular, since the vehicle speed is high, gear shifting permission is not immediately issued even if the shift lever is operated. Therefore, the braking force cannot be increased by downshifting. However, instead of downshifting, the regenerative torque is increased. This ensures responsiveness of deceleration to lever operations. Furthermore, gear shifting is performed with fluctuations in the braking force suppressed after waiting for the vehicle speed to drop. This achieves both high deceleration responsiveness to lever operations and a smooth ride during gear shifting even if the vehicle speed is high. In general, a braking control suitably meeting the needs of the driver is performed.

Embodiment 2

Embodiment 2 is a modification of Embodiment 1. Embodiment 2 will be described with an emphasis on how it differs from Embodiment 1. Embodiment 2 differs with respect to Embodiment 1 in the operation (of motor controller 22 and friction brake controller 26) at the completion of gear shifting control.

As shown in FIGS. 6 and 7, control was performed in embodiment 1 to change the friction brake oil pressure when the gear shifting permission issues and when the gear shifting completes. However, it is desirable to reduce the number of oil pressure control operations as much as possible. A reduction in the number of oil pressure control operations also causes a reduction in the number of switching operations of the solenoid valve of the regulating valve 15. A reduction in the number of switching operations results in extended valve life. Furthermore, the reduction in the number of switching operations results in a reduction in the failure probability during switching, thereby raising reliability. The shock generated with the switching of the solenoid valve (changes in the friction brake oil pressure) also decreases in number. These advantages apply not only to the solenoid valve, but also to other components in the friction brake system.

Consequently, embodiment 2 reduces the number of changes in the friction brake oil pressure in the manner described below. As with embodiment 1, embodiment 2 will be described with reference to case 1 and case 2 of FIG. 5.

Case 1 (gear shifting immediately after shift lever operation)

Figure 8:
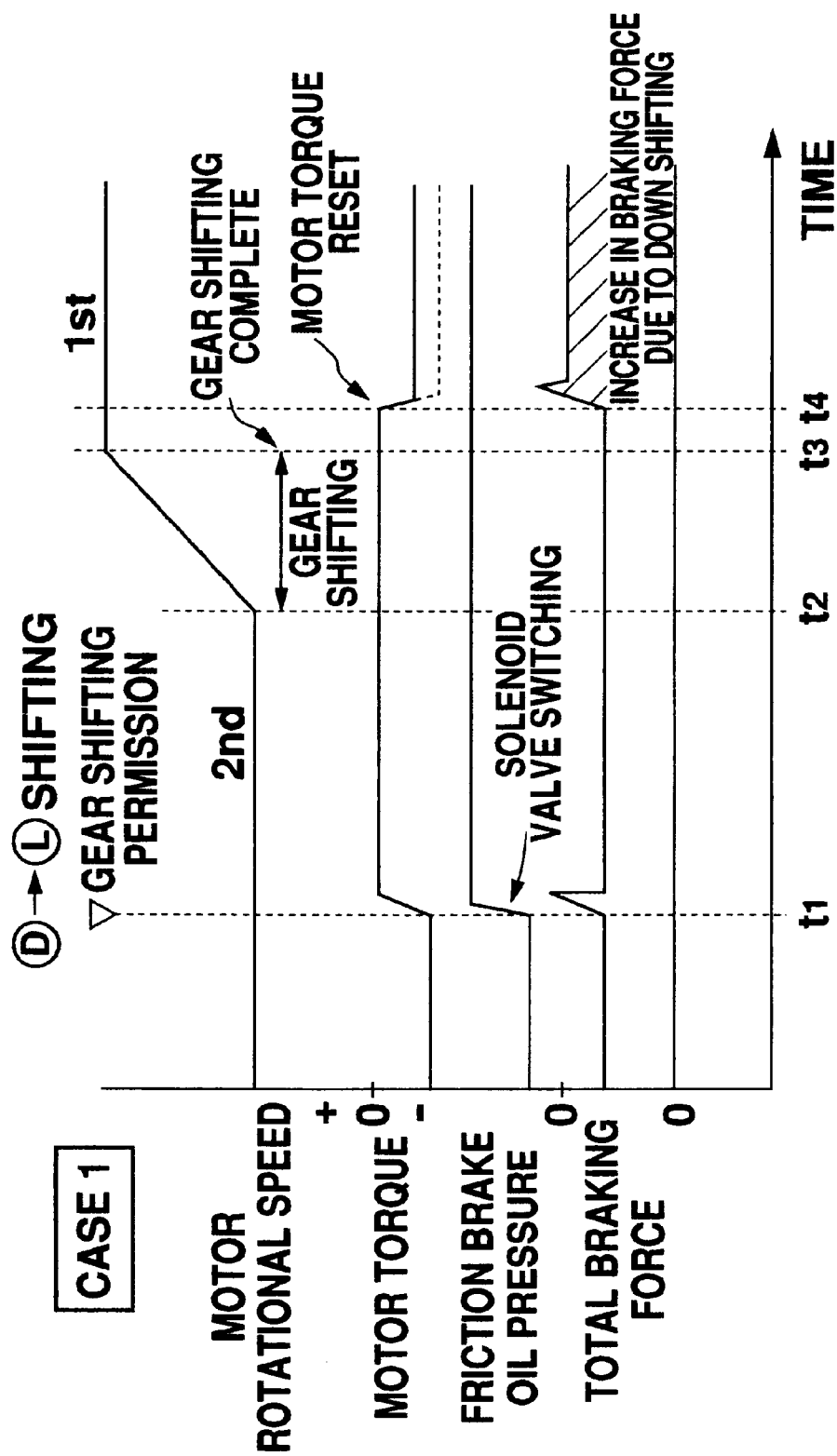
FIG. 8 is a timing chart for braking control in case 1 of FIG. 5 for embodiment 2.

FIG. 8 is a timing chart for the operation in case 1. The operation until time t3 is the same as shown in FIG. 6 for embodiment 1 so the description thereof will be omitted. At time t4, the completion of the gear shifting control is sent from the transmission controller 24 to the motor controller 22 and friction brake controller 26. At this time, the friction braking force is kept constant during and after gear shifting control. The friction brake controller 26 does not switch the solenoid valve of the regulating valve 15. The friction brake oil pressure also does not change.

The motor controller 22 again causes the electric motor to generate a regenerative torque. However, the regenerative torque has a value different from that shown in FIG. 4. The wheel shaft deceleration torque for the L range in FIG. 4 is TL+kF (broken line in FIG. 8). On the other hand, during deceleration control, a wheel shaft deceleration torque TD+kF for the D range is generated from the friction brake. The electric motor generates a regenerative torque corresponding to the difference TL−TD between these wheel shaft torque values. The value of this regenerative torque is (TL−TD)/i1 (solid line in FIG. 8).

From this sort of control, the total braking force at time t4 increases, as in Embodiment 1. The amount of increase corresponds to the difference TL−TD in the wheel shaft deceleration torque, when the brake depressing force is constant from time t1 to t4.

As described above, when the driver operates the shift lever, the regenerative torque during gear shifting control is approximately zero, although the braking force does not drop as it did in Embodiment 1. Therefore, the increase in braking force is performed smoothly. Deceleration can be increased without the driver experiencing a poor ride. In Embodiment 2 in particular, control is not performed to change the friction brake oil pressure at time t4. Therefore, the number of operations to control the friction brake oil pressure can be halved. The number of operations to switch the regulating valve 15 can also be reduced. Furthermore, since the momentary increase in braking force that existed at time t4 in FIG. 6 does not occur, braking is smoother.

Case 2 (Gear Shifting After Waiting for the Vehicle Speed to Drop After Shift Lever Operation)

Figure 9:
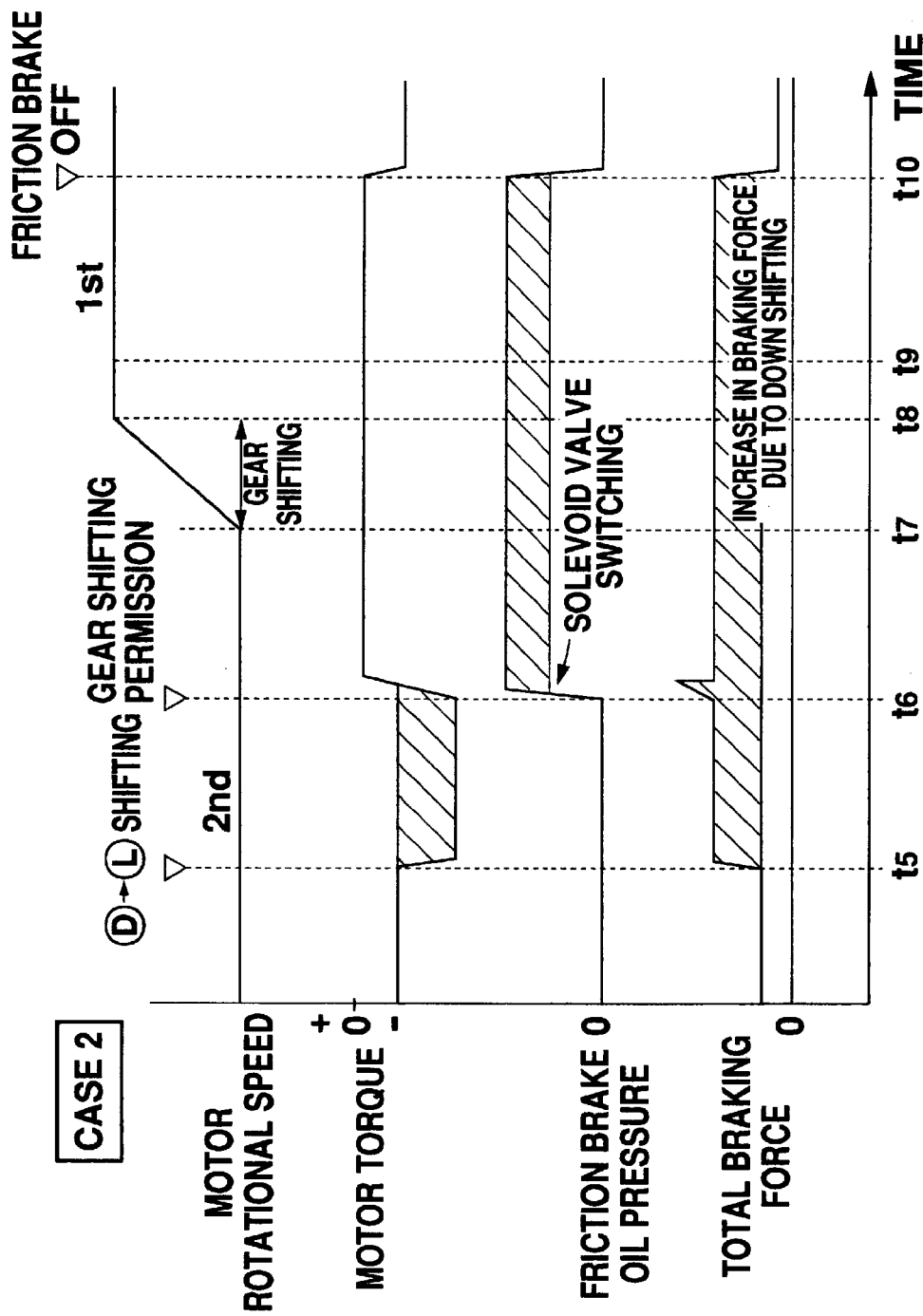
FIG. 9 is a timing chart for braking control in case 2 of FIG. 5 for embodiment 2.

FIG. 9 is a timing chart for the operation in case 2. The operation until time t8 is the same as shown in FIG. 7 for embodiment 1 so the description thereof will not be repeated. At time t9, the completion of the gear shifting control is sent from the transmission controller 24 to the motor controller 22 and friction brake controller 26. At this time, as in case 1, the friction braking force is kept constant during and after gear shifting control. The friction brake controller 26 does not switch the solenoid valve of the regulating valve 15. The friction brake oil pressure also does not change.

Prior to time t9, the wheel shaft deceleration torque for the L range is already achieved only by the friction braking force. The friction braking force is maintained even after time t9. At time t9, it is not necessary to increase the total braking force. As shown in FIG. 8, the motor controller 22 maintains the motor torque approximately at zero. Regenerative torque is not generated.

As described above, the braking force during gear shifting does not drop and the braking force increases smoothly as in Embodiment 1. Furthermore, high deceleration responsiveness to lever operations and smooth gear shifting are both achieved also during high vehicle speeds. In particular, control is not performed at time t9 to change the friction brake oil pressure. Therefore, the number of operations to control the friction brake oil pressure can be halved. The number of operations to switch the regulating valve 15 can also be reduced to one half. Furthermore, since the momentary increase in braking force that existed at time t9 in FIG. 7 does not occur, braking is smoother.

In Embodiment 2, the control after t4 in case 1 or after t9 in case 2 differs from the basic control in FIGS. 2 and 4.

Restoring the basic control may be performed, for example, when the braking force thereafter reaches zero. The operation at this time is shown at time t10 in FIG. 9. At time t10, the driver releases the brake pedal, thus causing the brake depressing force F to become zero. The motor controller 22 returns to the control shown in FIGS. 2 and 4, and the regenerative torque (TL+kF)/i1 for the first speed in the L range is generated (TL/i1 since F=0).

Brake controlling apparatuses for the embodiments were described above. The transmission for the embodiments is a two forward speed type having two travel ranges D and L. However, the present invention is of course applicable to electric vehicles equipped with different types of transmissions. For example, the present invention can be applied to transmissions having a greater number of gear stages.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A brake controlling apparatus for an electric vehicle for transferring torque of an electric motor to wheels via a transmission, the brake controlling apparatus comprising:

regenerative brake controlling means for furnishing a regenerative braking force to a vehicle by causing the electric motor to generate regenerative torque;

transmission controlling means for performing gear shifting control to switch a stage of gear of the transmission on the basis of a gear shifting operation by a driver, thereby changing the regenerative braking force according to the stage of gear; and friction brake controlling means for controlling a friction braking force from a friction brake, and furnishing to the vehicle the friction braking force equivalent to the difference between a required braking force required by the vehicle and the regenerative braking force;

wherein, during gear shifting control corresponding to the occurrence of said gear shifting operation the regenerative brake controlling means sets the regenerative torque essentially to zero, and the friction brake controlling means supplements with friction braking force the regenerative braking force that was furnished to the vehicle prior to gear shifting control.

2. The brake controlling apparatus for the electric vehicle according to claim 1 wherein, after completion of said gear shifting control, the friction braking control means maintains the friction braking force during gear shifting control, and the regenerative brake controlling means furnishes to the vehicle a regenerative braking force equivalent to the difference between the required braking force and the friction braking force.

3. The brake controlling apparatus for the electronic vehicle according to claim 1 wherein the transmission controlling means compares, when gear shifting operation is performed, the present vehicle speed with a predetermined gear shifting standard vehicle speed, and suspends execution of gear shifting control while the present speed exceeds the gear shifting standard vehicle speed, and wherein a required braking force corresponding to the gear stage after gear shifting is generated by at least either the regenerative brake controlling means or the friction brake controlling means while execution of gear shifting control is suspended.

* * * * *